(12) United States Patent
Glugla et al.

(10) Patent No.: US 9,527,494 B2
(45) Date of Patent: Dec. 27, 2016

(54) SYSTEM AND METHOD FOR ADJUSTING DRIVELINE OPERATION

(71) Applicant: Ford Global Technologies, LLC, Dearborn, MI (US)

(72) Inventors: Chris Paul Glugla, Macomb, MI (US); Douglas James McEwan, Royal Oak, MI (US); Garlan J. Huberts, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/605,621

(22) Filed: Jan. 26, 2015

(65) Prior Publication Data

US 2016/0214596 A1 Jul. 28, 2016

(51) Int. Cl.
*B60W 10/00* (2006.01)
*B60W 20/00* (2016.01)

(52) U.S. Cl.
CPC .............. *B60W 10/00* (2013.01); *B60W 20/00* (2013.01)

(58) Field of Classification Search
CPC .... B60W 10/06; B60W 10/10; B60W 30/188; B60W 50/06; B60W 2050/0079; F02D 41/2487; F16H 61/0006; G07C 5/008
See application file for complete search history.

(56) References Cited

U.S. PATENT DOCUMENTS

| | | | |
|---|---|---|---|
| 8,151,567 B2 | 4/2012 | Rollinger et al. | |
| 8,439,012 B2 | 5/2013 | Martin et al. | |
| 8,612,135 B1 | 12/2013 | Montemerlo et al. | |
| 8,655,537 B2 | 2/2014 | Ferguson et al. | |
| 8,924,124 B2 | 12/2014 | Lockwood et al. | |
| 9,108,632 B2* | 8/2015 | Gibson | B60W 20/10 |
| 2003/0216889 A1* | 11/2003 | Marko | G07C 5/0808 |
| | | | 702/182 |
| 2007/0168104 A1* | 7/2007 | Nelson | G08G 1/207 |
| | | | 701/93 |
| 2010/0072290 A1* | 3/2010 | Dage | B60H 1/00657 |
| | | | 236/51 |
| 2011/0270468 A1* | 11/2011 | Kristinsson | B60W 30/18 |
| | | | 701/2 |
| 2012/0065821 A1* | 3/2012 | Hessell | B60W 10/08 |
| | | | 701/22 |
| 2012/0270699 A1* | 10/2012 | Stoller | B60W 10/06 |
| | | | 477/110 |
| 2013/0184966 A1 | 7/2013 | Lockwood et al. | |
| 2014/0180512 A1* | 6/2014 | Kozloski | B60W 20/1082 |
| | | | 701/22 |

FOREIGN PATENT DOCUMENTS

EP 1760603 A1 3/2007

OTHER PUBLICATIONS

Glugla, Chris P. et al., "Method and System for Engine and Powertrain Control," U.S. Appl. No. 14/175,706, filed Feb. 7, 2014, 54 pages.

* cited by examiner

*Primary Examiner* — Jerrah Edwards
*Assistant Examiner* — Tamara Weber
(74) *Attorney, Agent, or Firm* — Julia Voutyras; Alleman Hall McCoy Russell & Tuttle LLP

(57) ABSTRACT

Methods and systems for determining driveline control parameters for a vehicle are described. In one example, a method for requesting a vehicle to operate in a specific operating region based on a request from a cloud network is described. The method may include options for driver interaction and autonomous vehicle operation.

18 Claims, 7 Drawing Sheets

SYSTEM AND METHOD FOR ADJUSTING DRIVELINE OPERATION

FIELD

The field of the disclosure generally relates to adjusting control parameters of a vehicle driveline to improve vehicle emissions, efficiency, and performance.

BACKGROUND AND SUMMARY

A vehicle driveline may include an internal combustion engine, a motor, and a transmission. The engine, motor, and transmission may be operated according to control parameters that are stored in tables and/or functions in memory. The tables and/or functions may be populated with values that vehicle developers determine by carefully operating the engine, motor, and transmission under controlled conditions. The determined parameters may number into the hundreds or thousands depending on the vehicle's complexity and operating requirements. Further, optimal values for the parameters may vary slightly between different vehicles due to manufacturing tolerances. Consequently, it may take many development hours to determine a complete mapping of engine, motor, and transmission control parameters. Therefore, it would be desirable to provide a way of determining engine, motor, and transmission control parameters with fewer development hours.

The inventors herein have recognized the above-mentioned issues and have developed a method for operating a driveline, comprising: receiving driveline parameter mapping conditions to a controller in a vehicle from a remote off vehicle network; and adjusting, driveline operation conditions to the driveline parameter mapping conditions via the controller.

By broadcasting a driveline parameter mapping request to a vehicle controller, it may be possible to provide the technical result of reducing a number of development hours to populate driveline control parameters of a vehicle controller. In one example, a network controller stores vehicle control parameters to memory and actively requests one or more vehicles to operate under select conditions to provide data and/or control parameters for revising or updating default vehicle control parameters. The data and/or control parameters may be a basis for adjusting control parameters of a plurality of other vehicles once the data and/or control parameters have been uploaded to a remote off vehicle cloud network. In this way, it may be possible to reduce a number of hours to populate control parameters The present description may provide several advantages. In particular, the approach may provide reduce a number of development hours to determine driveline control parameters. Additionally, the approach allows for autonomous vehicle operation without a driver to determine driveline control parameters. Further, the approach may request only selected driveline mapping conditions so that driveline mapping may be performed more efficiently. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Finally, the above explanation does not admit any of the information or problems were well known.

DETAILED DESCRIPTION

Figure 1:
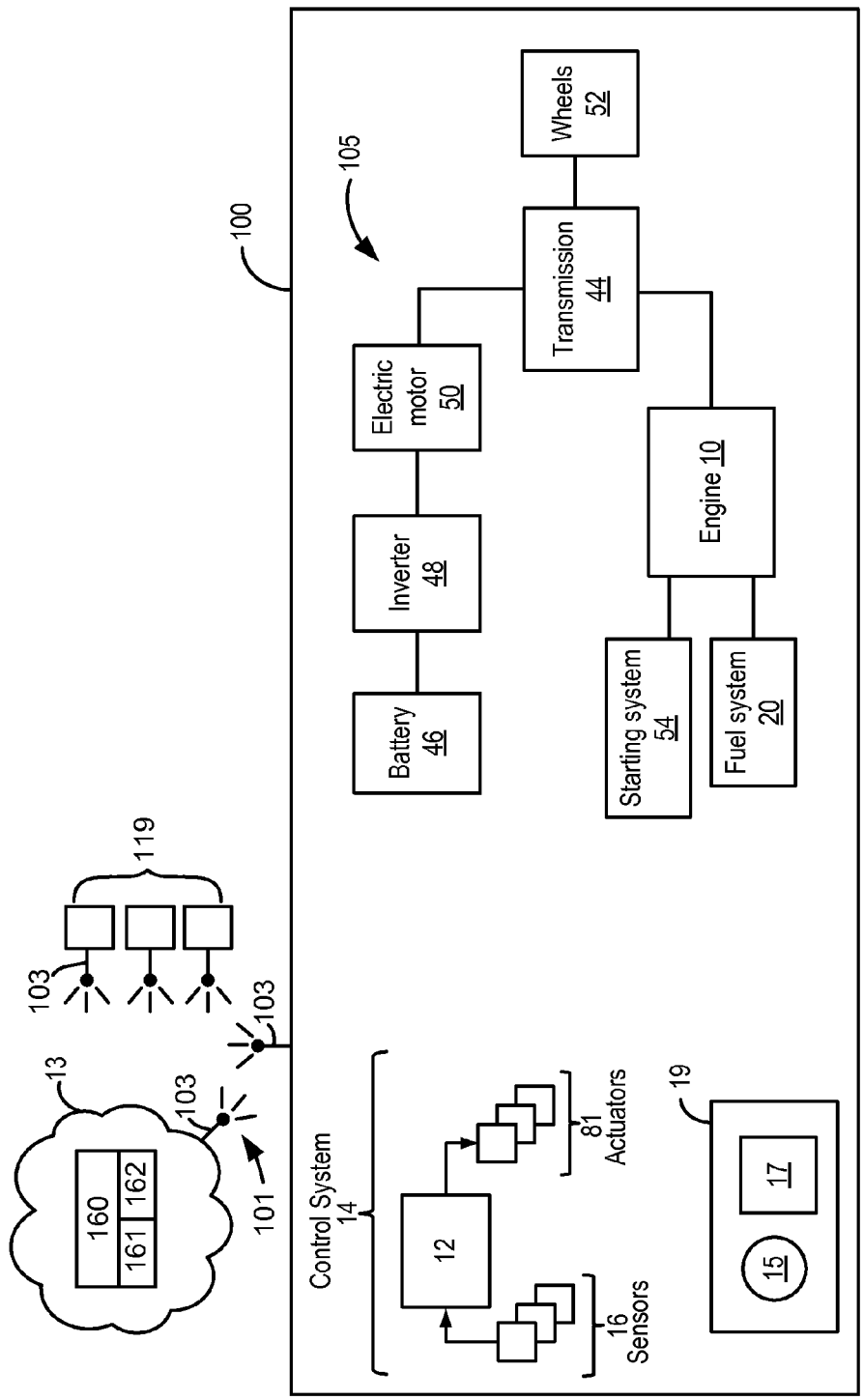
FIG. 1 is a block diagram of a vehicle.

Methods for operating a vehicle to improve control system parameter mapping are described. In one example, a method is provided for commanding a vehicle driveline to operate at conditions desirable for determining vehicle driveline control parameters. The vehicle may be configured as shown in FIG. 1. The vehicle may include an engine as is show in FIG. 2. The engine and driveline may be operated according to the method of FIGS. 3-6 to determine mature driveline control parameters. The vehicle of FIG. 1 may be remotely commanded to operate at select conditions for determining driveline control parameters according to the method of FIG. 7.

FIG. 1 schematically depicts a vehicle 100 including a driveline 105. Driveline 105 includes an internal combustion engine 10, a motor 50, inverter 48, and transmission 44. However, in other examples, driveline 105 may include only an engine and a transmission, only a motor, or only a motor and a transmission. Internal combustion engine 10 may have a plurality of cylinders, and engine output torque may be transmitted to transmission 44. Engine 10 also includes a starting system 54 which include an electric starter. Fuel is provided to engine 10 via fuel system 20. Fuel supplied to engine 10 may be gasoline, a mixture of gasoline and alcohol, or diesel. Electric motor 50 may also supply torque or absorb torque from transmission 44. Electric motor 50 may be supplied power by battery 46 via inverter 48. Electric motor 50 may also charge battery 46 via inverter 48 during regenerative braking Transmission 44 is mechanically coupled to vehicle wheels 52 to deliver power to a road surface.

Vehicle 100 may also include a human/machine interface or display 19. A driver may be prompted to supply input to vehicle 100 via display panel 17. The driver may input responses to driveline controller 12 via inputs 15. The driver may input acknowledgements, command values, and submit requests via inputs 15. Inputs 15 may include but are not limited to pushbuttons, switches, keyboard, and touch panel.

Driveline control system 14 includes controller 12, sensors 16, and actuators 81 to operate driveline 105. Sensors 16 may be coupled to engine 10 and/or motor 50, and/or inverter 48, and/or battery 46. Sensors 16 may include sensors shown in FIG. 2 as well as current sensors for determining current flow between battery 46 and motor 50, motor position sensors, transmission input and output position sensors, vehicle speed sensors, global positioning system sensors, ambient humidity sensors, radar and or sonic vehicle position sensors for sensing surrounding traffic, radio frequency sensors for receiving traffic condition information, wheel speed sensors, ambient temperature sensors, ambient pressure sensors, receivers and antenna for interfacing with radio frequency communication system 101, and ambient humidity sensors. Actuators 81 may be coupled to inverter 48, motor 50, transmission 44, and engine 10. Actuators may include but are not limited to the actuators shown in FIG. 2, switches or transistors in inverter 48 for controlling current flow between motor 50 and battery 46, transmitters and antenna for interfacing with radio frequency communication system 101, and transmission gear clutches.

Radio frequency communication system 101 includes antennas 103 for transmitting and receiving vehicle driveline control parameters and vehicle data between cloud 13, other vehicles 119, and vehicle 100. Cloud 13 is a remote system network not residing in vehicle 100 or other vehicles 119. Cloud 13 includes a processing unit 160, memory 161, and inputs/outputs 162 for receiving and providing data and control parameters to vehicle 100 and other vehicles 119. Processing unit 160 may include optimization routines that operate on data and/or driveline control parameters received from vehicle 100 and other vehicles 119. Processing unit 160 may broadcast driveline control parameters to vehicle 100 and other vehicles 119 via radio frequency communication system 101. Radio frequency communication system 101 may include stationary antenna towers and/or satellites for receiving and broadcasting driveline control parameters and data.

Figure 2:
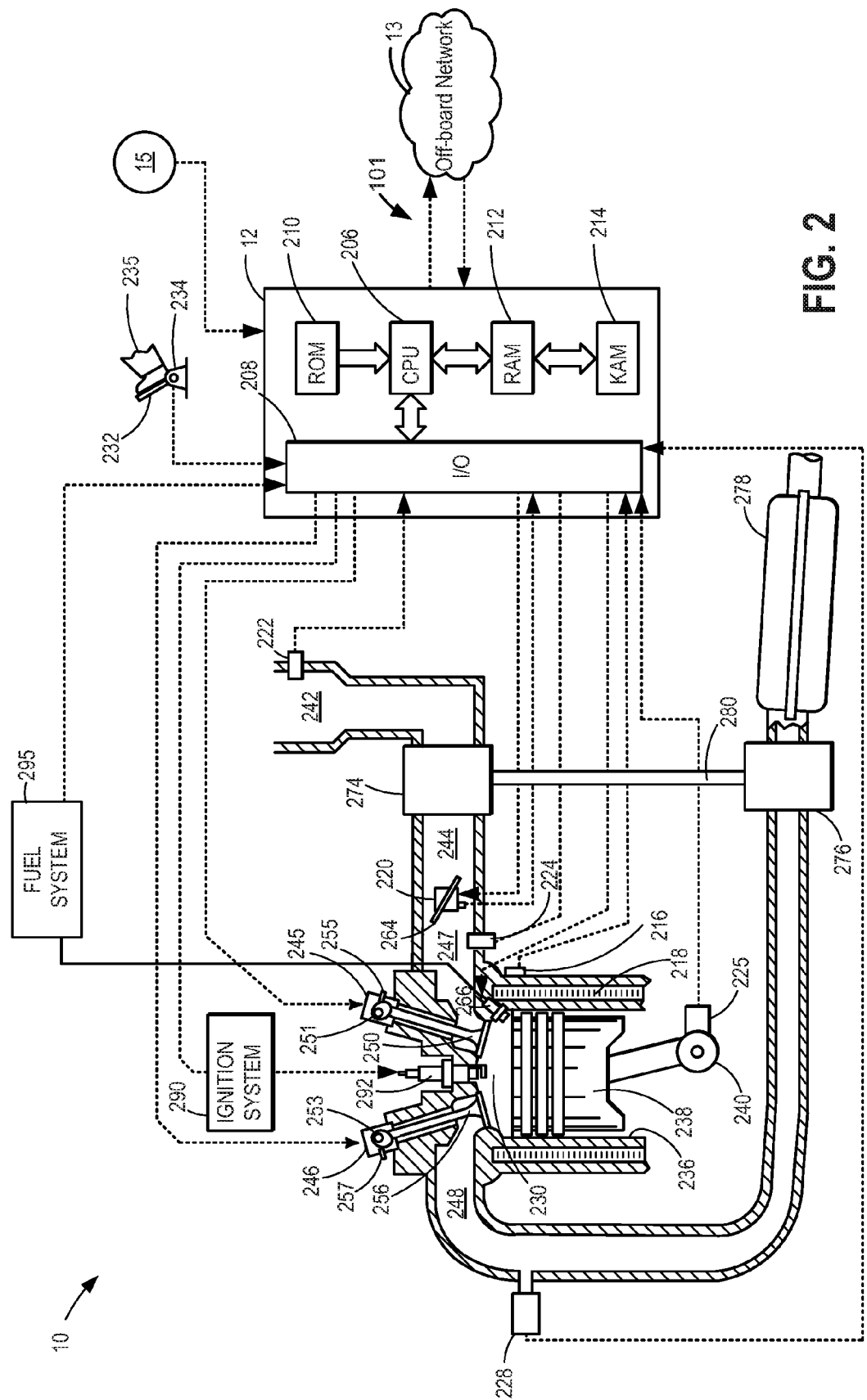
FIG. 2 is a schematic view of an engine of a vehicle.

Turning now to FIG. 2, a schematic diagram illustrates one cylinder of multi-cylinder engine 10, which may be included in a propulsion system vehicle 100 shown in FIG. 1. Engine 10 may be controlled at least partially by a control system including controller 12 and by input from a vehicle operator 235 via an input device 232. In this example, input device 232 includes an accelerator pedal and a pedal position sensor 234 for generating a proportional pedal position signal. Combustion chamber (i.e., cylinder) 230 of engine 10 may include combustion chamber walls 236 with piston 238 positioned therein. In some examples, the face of piston 238 inside cylinder 30 may have a bowl. Piston 238 may be coupled to crankshaft 240 so that reciprocating motion of the piston is translated into rotational motion of the crankshaft. Crankshaft 240 may be coupled to at least one drive wheel of a vehicle via an intermediate transmission system as is shown in FIG. 1. Further, a starter motor may be coupled to crankshaft 240 via a flywheel to enable a starting operation of engine 10.

Combustion chamber 230 may receive intake air from intake manifold 247 via intake boost chamber 244 and may exhaust combustion gases via exhaust passage 248. Intake manifold 247 and exhaust passage 248 can selectively communicate with combustion chamber 230 via a respective intake valve 250 and exhaust valve 256. In some examples, combustion chamber 230 may include two or more intake valves and/or two or more exhaust valves.

Intake valve 250 may be controlled by controller 12 via valve actuator 245 and cam 251. Similarly, exhaust valve 256 may be controlled by controller 12 via valve actuator 246 and cam 253. Alternatively, the variable valve actuator may be electro hydraulic or any other conceivable mechanism to enable valve actuation. During some conditions, controller 12 may vary the signals provided to actuators 245 and 246 to control the opening and closing times of the respective intake and exhaust valves. The position of intake valve 250 and exhaust valve 256 may be determined by valve position sensors 255 and 257, respectively. Valve actuators 245 and 246 may utilize one or more of cam profile switching (CPS), variable cam timing (VCT), variable valve timing (VVT) and/or variable valve lift (VVL) systems to vary valve operation.

Fuel injector 266 is shown coupled directly to combustion chamber 230 for injecting fuel directly therein in proportion to a pulse width received from controller 12. In this manner, fuel injector 266 provides what is known as direct injection of fuel into combustion chamber 230. The fuel injector may be mounted in the side of the combustion chamber or in the top of the combustion chamber, for example. Fuel may be delivered to fuel injector 266 by a fuel system 295 including a fuel tank, a fuel pump, and a fuel rail.

Ignition system 290 can provide an ignition spark to combustion chamber 230 via spark plug 292 in response to a spark advance signal from controller 12. Though spark ignition components are shown, in some examples, combustion chamber 230 or one or more other combustion chambers of engine 10 may be operated in a compression ignition mode, with or without an ignition spark.

Intake passage 242 or intake manifold 247 may include a throttle 220 having a throttle plate 264. In this particular example, the position of throttle plate 264 may be varied by controller 12 to open and close throttle 220 via an electric motor or actuator included with throttle 220, a configuration that is commonly referred to as electronic throttle control (ETC). In this manner, throttle 220 may be operated to vary the intake air provided to combustion chamber 230 among other engine cylinders. The position of throttle plate 264 may be provided to controller 12 by a throttle position sensor (not shown). Intake passage 242 may include a mass airflow sensor 222 and a manifold air pressure sensor 224 for providing respective signals MAF and MAP to controller 12.

Engine 10 may further include a compression device such as a turbocharger or supercharger including at least a compressor 274 arranged along intake 242. For a turbocharger, compressor 274 may be at least partially driven by a turbine 276 (e.g., via a shaft 280) arranged along exhaust passage 248. For a supercharger, compressor 274 may be at least partially driven by the engine 10 and/or an electric machine, and may not include a turbine. Thus, the amount of compression provided to one or more cylinders of the engine via a turbocharger or supercharger may be varied by controller 12.

Exhaust gas sensor 228 is shown coupled to exhaust passage 248 upstream of emission control device (ECD) 278. Exhaust gas sensor 228 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

ECD 278 is shown arranged along exhaust passage 248 downstream of exhaust gas sensor 228. In some examples, ECD 278 includes the three-way catalyst (TWC) and/or a particulate filter.

Controller 12 is shown in FIG. 2 as a microcomputer, including microprocessor 206, input/output ports 208, an electronic storage medium (e.g., computer-readable) for executable programs and control parameter values shown as read-only or non-transitory memory 210 in this particular example, random access memory 212, keep alive memory 214, and a data bus.

Controller 12 may receive various signals from sensors coupled to engine 10, in addition to those signals previously discussed, including measurement of inducted mass airflow (MAF) from mass airflow sensor 222; engine coolant temperature (ECT) from temperature sensor 216 coupled to cooling sleeve 218; a crankshaft position sensor 225 (or other type) sensing position of crankshaft 240; throttle position (TP), or throttle opening, from a throttle position sensor; and absolute manifold pressure signal, MAP, from sensor 224. Engine speed signal, RPM, may be generated by controller 12 from sensor 225. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 225, which is also used as an engine speed sensor, may produce a predetermined number of equally spaced pulses every revolution of the crankshaft.

Controller 12 may receive commands from driver or operator 231 via driver inputs 15. Controller 12 may also receive and/or send or broadcast driveline data including control parameters to cloud 13 via radio frequency communication system 101.

Storage medium read-only memory 210 can be programmed with computer readable data representing instructions executable by microprocessor 206 for performing the methods described herein, as well as other variants that are anticipated but not specifically listed.

As described above, FIG. 2 shows only one cylinder of a multi-cylinder engine, and each cylinder may similarly include its own set of intake/exhaust valves, fuel injector, spark plug, etc.

During operation, each cylinder within engine 10 typically undergoes a four stroke cycle: the cycle includes the intake stroke, compression stroke, expansion stroke, and exhaust stroke. During the intake stroke, generally, the exhaust valve 256 closes and intake valve 250 opens. Air is introduced into combustion chamber 230 via intake manifold 247, and piston 238 moves to the bottom of the cylinder so as to increase the volume within combustion chamber 230. The position at which piston 238 is near the bottom of the cylinder and at the end of its stroke (e.g. when combustion chamber 230 is at its largest volume) is typically referred to by those of skill in the art as bottom dead center (BDC).

During the compression stroke, intake valve 250 and exhaust valve 256 are closed. Piston 238 moves toward the cylinder head so as to compress the air within combustion chamber 230. The point at which piston 238 is at the end of its stroke and closest to the cylinder head (e.g. when combustion chamber 230 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 292, resulting in combustion.

During the expansion stroke, the expanding gases push piston 238 back to BDC. Crankshaft 240 converts piston movement into a rotational torque of the rotary shaft. Finally, during the exhaust stroke, the exhaust valve 256 opens to release the combusted air-fuel mixture to exhaust manifold 248 and the piston returns to TDC. Note that the above is shown merely as an example, and that intake and exhaust valve opening and/or closing timings may vary, such as to provide positive or negative valve overlap, late intake valve closing, or various other examples.

Referring now to FIGS. 3-6, an example method for operating a vehicle driveline is shown. The method of FIGS. 3-6 may be included in the system of FIGS. 1 and 2 as executable instructions stored in non-transitory memory. Further, the method of FIGS. 3-6 may work in conjunction with the method of FIG. 7.

At 301, method 300 determines driveline operation regions stored in memory that include immature driveline control parameter values. Driveline operating regions may include but are not limited to engine speed ranges (e.g., 1000 RPM-2000 RPM), engine torque ranges (e.g., 5 Nm-400 Nm), motor torque ranges (e.g., 0 Nm-200 Nm), motor speed ranges (e.g., 0 RPM-1000 RPM), transmission input speed ranges (e.g., 0 RPM-6000 RPM), transmission input torque ranges (e.g., 0 Nm-500 Nm), motor input current (e.g., 1-200 Amperes), motor output current (e.g., 1-100 Amperes), inverter input current (e.g., 1-200 Amperes), inverter output current (e.g., 1-300 Amperes).

Immature driveline control parameter values are variable values stored in memory that are the basis of control commands, controller operating states, and control variables that have not been adjusted responsive to operating conditions of a vehicle. Immature driveline control parameters may be referred to as default driveline control parameters since they are parameters that have not been adjusted based on vehicle operation. The default driveline control parameters may be stored in individual variables, tables and/or functions.

In one example, the default driveline control parameters may contain predetermined values that have not been optimized or adjusted based on actual driveline operating conditions. If the predetermined values have changed, it may be determined that the specific driveline control parameters are not default or immature driveline control parameters. In other examples, an area of memory may be set aside to include bits in memory that indicate whether or not specific individual driveline control parameter have been adapted or adjusted based on operating conditions of the vehicle in which the driveline control parameters reside. If a specific driveline control parameter has been adjusted, the bit may be changed from a value of zero to a value of one. Method 300 judges if specific driveline control parameters are immature or mature (e.g., adjusted based on vehicle conditions of the vehicle in which the driveline control parameters reside) based on values of variables in memory. Default or immature driveline control parameters are identified and their specific locations in tables and/or function are identified. For example, data cells at column 3, row 2, to column 5, row 2 of a table describing minimum spark timing for best torque may be indicated as immature variables. Row 2 of the table may correspond to 700 RPM and column 3-5 may correspond to engine torque of 40-60 Nm. In this example, the 700 RPM and 40-60 N-m are driveline operating regions having immature driveline control parameters. Method 300 proceeds to 302 after determining which, if any, driveline control variables are immature.

At 302, method 300 indicates driveline operating regions where driveline operating or control parameters are immature to a cloud network that is off board the vehicle in which the driveline operating or control parameters reside. Method 300 may upload operating regions where driveline operating control parameters are immature to the cloud network at predetermined times such as when the vehicle is started or stopped. In one example, method 300 queries the cloud network and uploads driveline operating parameters in driveline operating regions where driveline operating parameters to the cloud network are immature. Method 300 proceeds to 303 after determining whether or not to upload control parameter operating regions to the cloud network.

At 303, method 300 judges whether or not the cloud network is requesting to update driveline control parameters. The cloud network may broadcast a request to update driveline control parameters at predetermined times, such as when the vehicle is stopped or being started for example. If method 300 judges that the cloud network is requesting to update driveline control parameters based on the determination at 302, the answer is yes and method 300 proceeds to 304. Otherwise, the answer is no and method 300 proceeds to 305.

At 304, method 300 receives driveline control parameters from the cloud network. The cloud network delivers control parameters to replace immature or default driveline control parameters via a wireless radio frequency communications system. Method 300 revises immature or default driveline control parameters in memory with values provided via the cloud network. Method 300 proceeds to exit after driveline control parameters are revised.

At 305, method 300 judges if there is a driveline control parameter request or data request from the cloud network. The cloud network may request mature (e.g., revised driveline control parameters based on operating conditions of the vehicle in which the parameters are determined) driveline control parameters or data from the vehicle driveline controller via a radio frequency communication system. If method 300 judges a request for driveline control parameters or data is present, the answer is yes and method 300 proceeds to 307. Otherwise, the answer is no and method 300 proceeds to 313 of FIG. 4.

At 307, method 300 judges if driveline control parameter or data collection is to be passive. Method 300 may judge passive driveline control parameter or data collection is desirable during select conditions. For example, method 300 may judge passive driveline control parameter collection is desirable when the vehicle is occupied by a person identified via a key fob, cell phone proximity, or in another way. Method 300 may judge passive driveline control parameter collection is desirable based on traffic conditions such as traffic congestion or when the vehicle is traveling on streets that have a speed limit less than a threshold speed. Passive collection may be initiated when the driveline operating region change for passive driveline parameter collection is less than a first threshold change from the present driveline operating region. Further, passive collection may require driveline operating parameters be within a first range (e.g., transmission input shaft speed less than 2500 RPM and transmission input torque less than 75 N-m), or that changes in driveline operating parameters be less than a threshold (e.g., less than 5% change in throttle position, less than 4% change in engine torque or speed, etc.). Passive control parameter or data collection may also require other driveline conditions such as but are not limited to not operating the vehicle in a school zone, operating the vehicle on roads not having less than a threshold coefficient of friction, population density not greater than a threshold, and not operating the vehicle at night driving conditions. Vehicle conditions may be determined via vehicle sensors, global positioning systems, or broadcast information. The passive collection mode may be the default mode if moderate and aggressive modes are not selected. If method 300 judges that passive driveline control parameter or data collection is desired, the answer is yes and method 300 proceeds to 310 of FIG. 4. Otherwise, the answer is no and method 300 proceeds to 308.

At 308, method 300 judges if driveline control parameter or data collection is to be moderate. Method 300 may judge moderate driveline control parameter or data collection is desirable during select conditions. For example, method 300 may judge moderate driveline control parameter collection is desirable when the vehicle is occupied by a person identified via a key fob, cell phone proximity, or in another way. Method 300 may judge moderate driveline control parameter collection is desirable based on traffic conditions such as absence of traffic congestion or when the vehicle is traveling on streets that have a speed limit greater than a threshold speed. Additional traffic conditions that may initiate moderate control parameter or data collection include but are not limited to operating the vehicle on a highway, roads with greater than a threshold coefficient of friction, population density less than a threshold, and day light driving conditions. Moderate collection may be initiated when the driveline operating region change for moderate driveline parameter collection is less than a second threshold change from the present driveline operating region. Additionally, moderate collection may require driveline operating parameters be within a second range (e.g., transmission input shaft speed less than 4500 RPM and transmission input torque less than 125 N-m) greater than the first range, or that changes in driveline operating parameters be less than a threshold (e.g., less than 10% change in throttle position, less than 10% change in engine torque or speed, etc.). Vehicle conditions may be determined via vehicle sensors, global positioning systems, or broadcast information. If method 300 judges that moderate driveline control parameter or data collection is desired, the answer is yes and method 300 proceeds to 320 of FIG. 5. Otherwise, the answer is no and method 300 proceeds to 350 of FIG. 6.

At 398, method 300 sends driveline control parameters that have a desirable confidence level to the cloud network. Driveline control parameters may be deemed confident after being adjusted a threshold number of times (e.g., two). Method sends the driveline control parameters and/or data via a radio frequency communications system. Method 300 proceeds to exit after the driveline control parameters and/or data are sent to the cloud network.

At 399, method 300 offers driveline control parameters and/or data to the cloud network. Method 300 may offer driveline control parameters and/or data to the cloud network at predetermined times such as after a predetermined number of miles have been acquired on the vehicle or when the vehicle is stopped and unoccupied. The cloud network may accept or deny the offer. Method 300 proceeds to exit after the driveline control parameters and/or data are offered to the cloud network.

Figure 4:
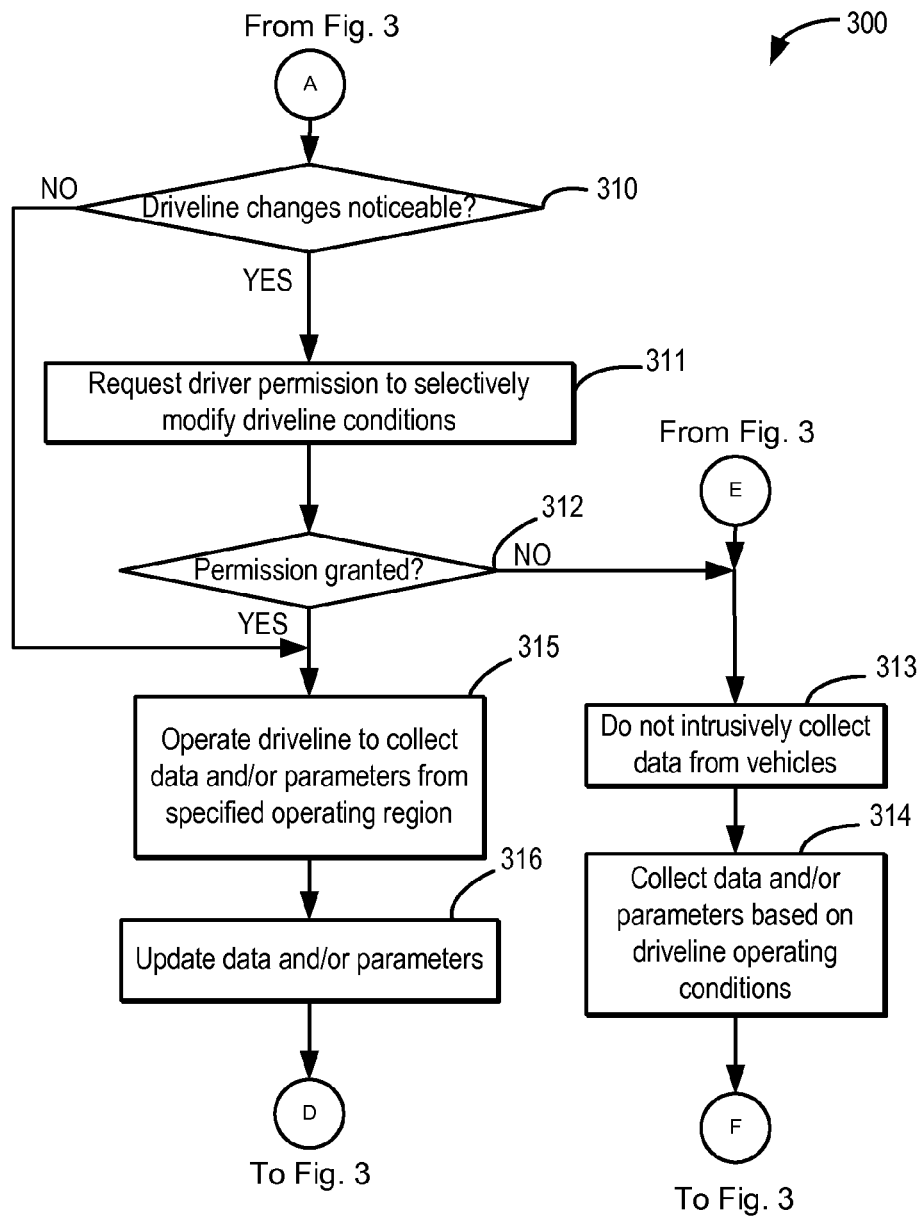

At 310 of FIG. 4, method 300 judges if changes to the vehicle's driveline operating conditions from present conditions would be noticeable. In one example, method 300 judges that driveline operating condition changes are noticeable if engine speed changes by more than a threshold speed (e.g., 500 RPM). In another example, method 300 judges that change are noticeable if motor speed changes by more than a threshold speed (e.g., 300 RPM). In still another example, method 300 judges that changes to the driving operating conditions are noticeable if engine torque changes by more than a predetermined amount from present engine torque output (e.g., 15%). In still another example, method 300 judges that changes to the driving operating conditions are noticeable if motor torque changes by more than a predetermined amount from present motor torque output (e.g., 15%). In still another example, method 300 judges that changes to the driving operating conditions are noticeable if shifting the transmission is required to operate the engine and/or motor at a desired speed and/or torque to acquire data or adjust and adapt driveline control parameters. If method 300 judges that driveline operating changes would be noticeable from present driveline operating conditions, the answer is yes and method 300 proceeds to 311. Otherwise, the answer is no and method 300 proceeds to 315.

At 311, method 300 requests permission from the vehicle driver or operator to selectively modify driveline operating conditions. Driveline operating conditions may include but are not limited to engine knock indications, engine air amount, engine oil pressure, engine air-fuel ratio, engine emissions concentrations (e.g., HC, NOx, CO, particulates), engine temperature, ambient temperature, ambient pressure, ambient humidity, engine speed, engine torque, motor speed, motor torque, transmission gear, torque converter clutch state (e.g., open, closed, or slip amount), engine throttle opening amount, engine cam positions, engine spark timing, motor current use, motor current when motor operated as a generator, inverter efficiency, inverter temperature, battery temperature, battery state of charge (SOC), transmission gear, transmission oil pressure, and turbocharger boost amount. Method 300 may request permission via a driver interface display or panel. Method 300 proceeds to 312 after driver permission to adjust or modify driveline operating conditions is requested.

At 312, method 300 judges whether or not a driver or operator has granted permission to adjust driveline operating conditions. The driver may grant permission via a driver interface or display panel. If a drive has permitted permission the answer is yes and method 300 proceeds to 315. Otherwise, the answer is no and method 300 proceeds to 313.

At 313, method 300 does not intrusively collect data or make adjustments to driveline operating conditions to adjust or adapt driveline operating control parameters. For example, if the cloud network requested to determine minimum spark timing for best torque at an engine speed of 1200 RPM and torque of 125 N-m while the engine was operating at 1150 RPM and 100 N-m, engine speed and torque adjustments are not performed by the driveline controller based on the cloud network request. Instead, the driveline operates according to drive demand torque (e.g., based on accelerator pedal position and vehicle speed) and driveline control parameters existing in the driveline controller. Method 300 proceeds to 314 after not adjusting driveline operating conditions based on the cloud network request.

At 314, method 300 may collect driveline data and adjust driveline control parameters in response to driveline operating conditions as requested by the driver. Driveline data collected may include but is not limited to engine knock indications, engine speed, engine torque or load, engine air amount, engine spark timing, engine oil pressure, engine air-fuel ratio, engine emissions concentrations (e.g., HC, NOx, CO, particulates), engine temperature, ambient temperature and pressure, engine fuel consumption, motor torque, motor current, motor temperature, motor speed, inverter efficiency, inverter current, inverter temperature, battery temperature, battery state of charge (SOC), vehicle speed, transmission gear, and transmission oil pressure. Further, adapted or adjusted driveline control parameters including but not limited to controller gains, transfer function (e.g., oxygen sensor volts to engine air-fuel ratio, motor torque curves, etc.) variables, MBT spark timing, borderline spark timing, etc. Method 300 may acquire data, adjust driveline control parameters, and collect driveline control parameters at operating conditions requested by the driver without cloud network operating conditions being provided by the driveline. Method 300 proceeds to 399 of FIG. 3 after collecting data and/or driveline control parameter based in driver requested driveline operating conditions.

At 315, method 300 adjusts driveline operating conditions to operate the driveline in regions requested by the cloud network. For example, method 300 may hold vehicle speed constant at a predetermined speed via adjusting engine torque and downshift a transmission to a lower gear to increase engine speed. In this way, the driveline may be operated at a different engine speed to collect driveline data and allow driveline control parameters to be adapted/adjusted at different engine speeds.

In another example, method 300 may operate the engine at a constant speed while sweeping spark timing (e.g., adjusting spark timing to more advanced and retarded spark timings from a base spark timing value) and opening the engine throttle. In this way, MBT and borderline spark timings may be determined based on engine torque and indications of knock. Further, exhaust temperatures may be determined based on the different spark timings.

In still another example, cam timings may be swept (e.g., adjusting cam timing to more advanced and retarded cam timings from a base cam timing value) while throttle position is adjusted to maintain engine torque or to provide a desired engine torque. Cylinder pressure sensors may provide data to determine indicated mean effective pressure (IMEP) to determine combustion stability and desirable cam timings. Intake manifold pressure may also be acquired for the purpose of determining cam timing values for reduced engine pumping losses.

Method 300 also adjusts or adapts control parameters at the operating conditions requested by the cloud network. For example, method 300 may adapt controller gains, transfer functions, and values in tables and/or functions that describe engine, motor, transmission, and inverter operation via adjusting the engine, motor, and transmission to conditions prescribed by the cloud network. In one example, method 300 adjusts a fuel injector transfer function based on exhaust gas oxygen sensor output (e.g., decreasing fuel injector output via adjusting the when the oxygen sensor indicates a rich air-fuel mixture). In this way, the driveline may be operated at conditions requested by the cloud network to acquire driveline data and adapt driveline control parameters. Method 300 proceeds to 316 after beginning to operate the driveline at conditions requested by the cloud network.

At 316, method 300 updates and/or adjusts driveline control parameters in memory based on operating the driveline at conditions requested by the cloud network. Further, method 300 may store acquired data collected while operating the driveline at conditions requested by the cloud network to memory. Method 300 proceeds to 398 after storing data and control parameters to memory.

Figure 5:
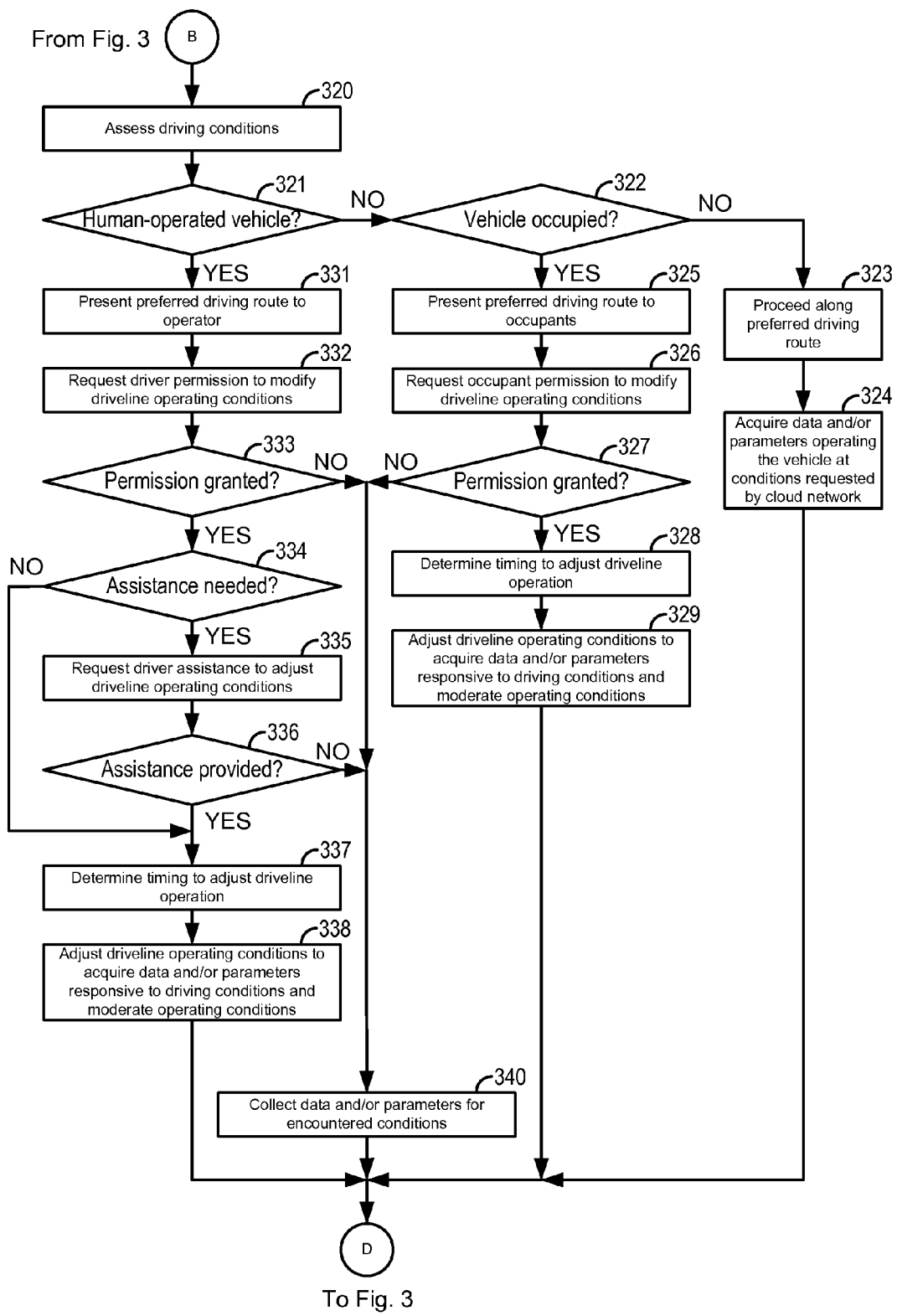

At 320 of FIG. 5, method 300 assesses driving conditions. Driving conditions may include but are not limited to posted vehicle speed, actual vehicle speed, proximity of vehicle to other vehicle (e.g., via sonic or radar), human population in area where vehicle is operating, engine speed, engine torque, motor speed, motor torque, selected transmission gear, engine temperature, ambient temperature and pressure, engine fuel flow, engine air flow, engine air-fuel ratio, day light or night conditions, road coefficient of friction, and identity of present driver. Method 300 proceeds to 321 after driving conditions are determined.

At 321, method 300 judges whether or not the vehicle is being operated by a driver or without a driver (e.g., autonomously). In one example, method determines if the vehicle is being operated by a driver based on a value of a variable stored in memory that indicates whether a driver or the vehicle controller is driving the vehicle. If method 300 judges that a human is driving the vehicle the answer is yes and method 300 proceeds to 331. Otherwise, the answer is no and method 300 proceeds to 322.

At 322, method 300 judges if the vehicle is occupied by a passenger while the vehicle is in moderate collection mode. In one example, method 300 judges if the vehicle is occupied based on seat sensors. Alternatively, method 300 may detect a passenger heart beat or a passenger via sonic sensors. If method 300 judges that the vehicle is occupied the answer is yes and method 300 proceeds to 325. Otherwise, the answer is no and method 300 proceeds to 323.

Figure 7:
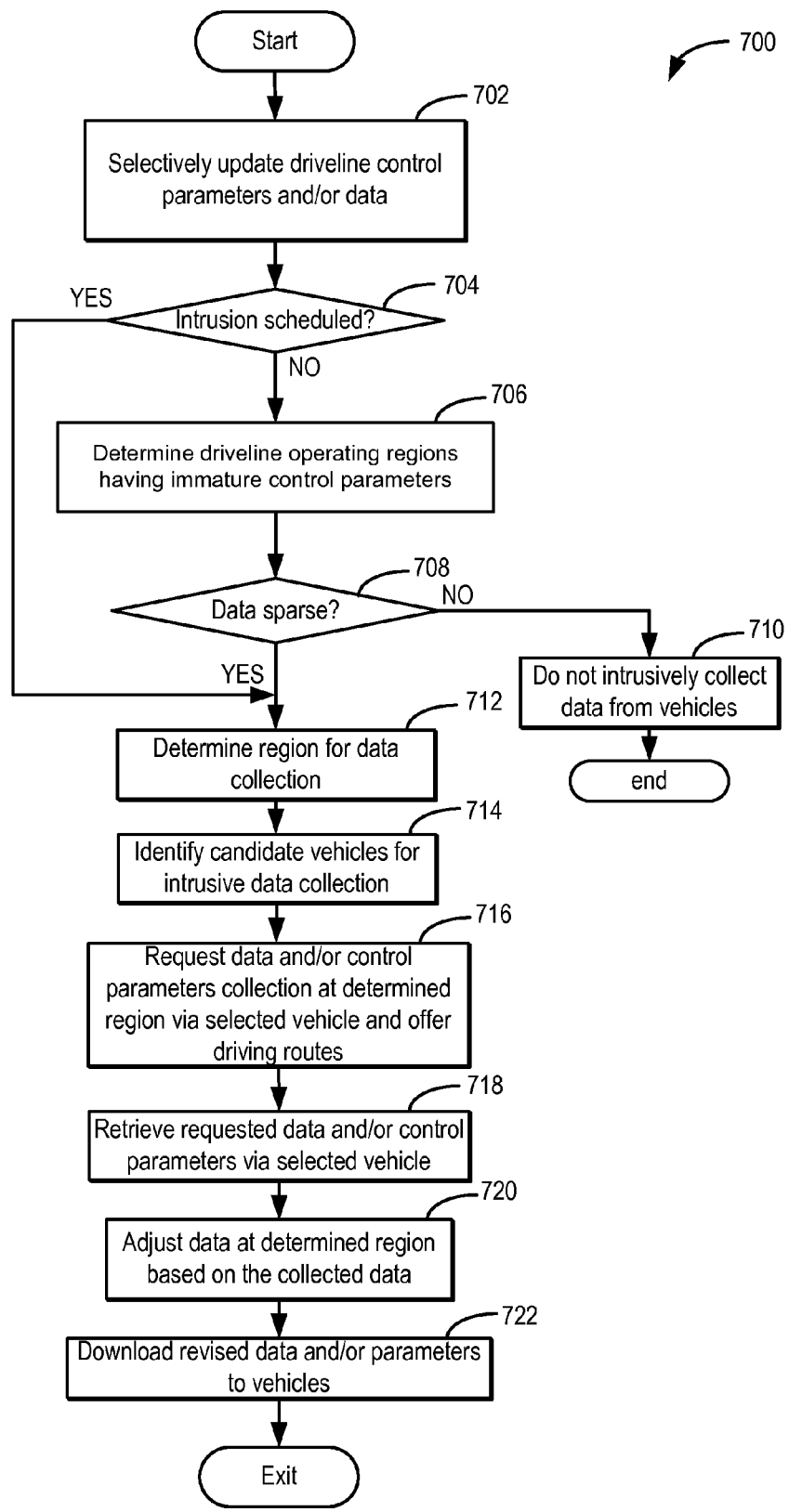
FIG. 7 shows an example method for a cloud network to map driveline control parameters.

At 323, method 300 proceeds to direct the vehicle to follow a driving route offered by the cloud network as is described at 716 of FIG. 7. The driving route may offer the vehicle more time and opportunities to operate the vehicle at conditions requested by the cloud network (e.g., operating regions determined to have immature control parameters). Method 300 operates the vehicle (e.g., adjusts the engine throttle, valve timing, spark timing, transmission gear, motor current, and engine air-fuel ratio, etc.) to proceed along the driving route offered by the cloud network and proceeds to 324.

At 324, method 300 acquires data and/or driveline control parameters in driveline operating regions determined to have immature control parameters and/or data. For example, method 300 may hold vehicle speed constant at a predetermined speed via adjusting engine torque and downshift a transmission to a lower gear to increase engine speed in the moderate collection mode. In this way, the driveline may be operated at a different engine speed to collect driveline data and allow driveline control parameters to be adapted/adjusted at different engine speeds. The changes in engine speeds, motor speeds, engine torques, motor torques, and transmission gears the vehicle is operated at in the moderate collection mode may be noticeable to a driver or passenger.

In another example, method 300 may operate the engine at a constant speed while sweeping spark timing (e.g., adjusting spark timing to more advanced and retarded spark timings from a base spark timing value) and opening the engine throttle in the moderate collection mode. In this way, MBT and borderline spark timings may be determined based on engine torque and indications of knock. Further, exhaust temperatures may be determined based on the different spark timings.

In still another example, cam timings may be swept (e.g., adjusting cam timing to more advanced and retarded cam timings from a base cam timing value) while throttle position is adjusted to maintain engine torque or to provide a desired engine torque in the moderate collection mode. Cylinder pressure sensors may provide data to determine indicated mean effective pressure (IMEP) to determine combustion stability and desirable cam timings. Intake manifold pressure may also be acquired for the purpose of determining cam timing values for reduced engine pumping losses.

Method 300 also adjusts and/or adapts control parameters at the operating conditions requested by the cloud network in the moderate collection mode. For example, method 300 may adapt controller gains, transfer functions, and values in tables and/or functions that describe engine, motor, transmission, and inverter operation via adjusting the engine, motor, and transmission to conditions prescribed by the cloud network. The driveline operating range may be significantly broader in the moderate collection mode than in the passive collection mode. For example, during the moderate collection mode, engine speed may be varied by 30% whereas in the passive collection mode engine speed may be varied by less than 5%. Other driveline operating conditions such as engine torque, motor speed, motor torque, transmission gear, and inverter current may be adjusted similarly between the passive and moderate collection modes. In this way, the driveline may be operated at conditions requested by the cloud network to acquire driveline data and adapt driveline control parameters.

In one example, the vehicle may be operated with radar based cruise control and the vehicle acceleration/deceleration rate may be adjusted to accelerate the vehicle at a lower rate than a base acceleration rate. At the same time, the transmission may be held in a specific gear so that control parameters and data may be collected for conditions different than base cruise control conditions. Thus, at 323 and 324, method 300 adjusts the vehicle driving route, vehicle operating conditions (e.g., throttle position, spark timing, valve timing, motor current, etc.), and acquires data and/or control parameters without driver approval. Method 300 proceeds to 398 after operating the driveline at conditions requested by the cloud network and acquiring data and/or control parameters.

At 325, method 300 presents a preferred driving route to vehicle occupants. The preferred driving route may be a route that is expected to present more opportunities or time for the driveline to operate at conditions where control parameters in the select operating regions are immature. The preferred driving route may be presented to vehicle occupants via a navigation system. Method 300 proceeds to 326 after the preferred driving route is presented to vehicle occupants.

At 326, method 300 requests occupant permission to modify driveline operating conditions so that the driveline operates in operating regions where control parameters are immature. Driveline operating conditions may include but are not limited to engine speed, engine torque, motor speed, motor torque, transmission gear, torque converter clutch state (e.g., open, closed, or slip amount), engine throttle opening amount, engine cam positions, engine spark timing, motor current use, motor current when motor operated as a generator, and turbocharger boost amount. Method 300 may request permission via a driver interface display or panel. Method 300 proceeds to 327 after requesting permission to modify driveline operating conditions.

At 327, method 300 judges whether or not vehicle occupants have granted permission to adjust driveline operating conditions. The driver may grant permission via a driver interface or display panel. If an occupant has granted permission the answer is yes and method 300 proceeds to 328. Otherwise, the answer is no and method 300 proceeds to 340. Method 300 also proceeds to operate the vehicle along the preferred driving route if permission is granted.

At 328, method 300 determines timing to adjust driveline operating conditions so that the driveline operates in ranges where control parameters are immature. In one example, method 300 may select times when the vehicle is not proximate to other vehicles. Further, method 300 may select a time when the vehicle is traveling a section of road that is more than a predetermined distance at a constant grade as a time to adjust driveline operating conditions. Further still, method 300 may select a time when a coefficient of friction of the road the vehicle is traveling on is greater than a threshold coefficient of friction as a time to adjust driveline operating conditions. Method 300 proceeds to 329 after timing to adjust driveline operating conditions to operate within a range where driveline operating parameters are immature is determined.

At 329, method 300 acquires data, adapts driveline control parameters, and/or acquires driveline control parameters in driveline operating regions determined to have immature control parameters and/or data in moderate collection mode. For example, method 300 may hold vehicle speed constant at a predetermined speed via adjusting engine torque and downshift a transmission to a lower gear to increase engine speed in the moderate collection mode. In this way, the driveline may be operated at a different engine speed to collect driveline data and allow driveline control parameters to be adapted/adjusted at different engine speeds. The engine speeds, motor speeds, engine torques, motor torques, and transmission gears the vehicle are operated at in the moderate collection mode in operating regions having immature control parameters where driveline operating condition adjustments from present operating conditions may be noticeable to a driver or passenger.

In another example, method 300 may operate the engine at a constant speed while sweeping spark timing (e.g., adjusting spark timing to more advanced and retarded spark timings from a base spark timing value) and opening the engine throttle in the moderate collection mode. In this way, MBT and borderline spark timings may be determined based on engine torque and indications of knock. Further, exhaust temperatures may be determined based on the different spark timings.

In still another example, cam timings may be swept (e.g., adjusting cam timing to more advanced and retarded cam timings from a base cam timing value) while throttle position is adjusted to maintain engine torque or to provide a desired engine torque in the moderate collection mode. Cylinder pressure sensors may provide data to determine indicated mean effective pressure (IMEP) to determine combustion stability and desirable cam timings. Intake manifold pressure may also be acquired for the purpose of determining cam timing values for reduced engine pumping losses.

Method 300 also adjusts and/or adapts control parameters at the operating conditions requested by the cloud network in the moderate collection mode. For example, method 300 may adapt controller gains, transfer functions, and values in tables and/or functions that describe engine, motor, transmission, and inverter operation via adjusting the engine, motor, and transmission to conditions (e.g., driveline operating regions) prescribed by the cloud network. The driveline operating range may be significantly broader in the moderate collection mode than in the passive collection mode. For example, during the moderate collection mode, engine speed may be varied by 30% whereas in the passive collection mode engine speed may be varied by less than 5%. Other driveline operating conditions such as engine torque, motor speed, motor torque, transmission gear, and inverter current may be adjusted similarly between the passive and moderate collection modes. In this way, the driveline may be operated at conditions requested by the cloud network to acquire driveline data and adapt driveline control parameters.

Thus, at 328 and 329, method 300 adjusts the vehicle driving route and acquires data and/or control parameters only after driver approval is received. Method 300 proceeds to 398 after operating the driveline at conditions requested by the cloud network and acquiring data and/or control parameters.

At 331, method 300 presents a preferred driving route to the vehicle's driver. The preferred driving route may be a route that is expected to present more opportunities or time for the driveline to operate at conditions where control parameters in the select operating regions are immature. The preferred driving route may be presented to vehicle occupants via a navigation system. Method 300 proceeds to 332 after the preferred driving route is presented to the vehicle driver.

At 332, method 300 requests driver permission to modify driveline operating conditions so that the driveline operates in operating regions where control parameters are immature. Driveline operating conditions may include but are not limited to engine speed, engine torque, motor speed, motor torque, transmission gear, torque converter clutch state (e.g., open, closed, or slip amount), engine throttle opening amount, engine cam positions, engine spark timing, motor current use, motor current when motor operated as a generator, and turbocharger boost amount. Method 300 may request permission via a driver interface display or panel. Method 300 proceeds to 333 after requesting permission to modify driveline operating conditions.

At 333, method 300 judges whether or not a driver or operator has granted permission to adjust driveline operating conditions. The driver may grant permission via a driver interface or display panel. If a driver has permitted permission the answer is yes and method 300 proceeds to 334. Otherwise, the answer is no and method 300 proceeds to 340. Method 300 also proceeds to operate the vehicle along the preferred driving route if permission is granted.

At 334, method 300 judges whether or not driver assistance is needed or desired to operate the vehicle in ranges where driveline control parameters are immature. For example, driver assistance to apply an accelerator pedal may be desired when a vehicle is accelerated from stop. If method 300 judges that driver assistance is needed, the answer is yes and method 300 proceeds to 335. Otherwise, the answer is no and method 300 proceeds to 337.

At 335, method 300 requests driver assistance. Driver assistance may be requested via a display panel or other means. Method 300 proceeds to 336 after driver assistance is requested.

At 336, method 300 judges if driver assistance has been provided. Driver assistance may be determined to be provided is a driver provides input to the vehicle controller (e.g., a driver applies an accelerator or brake pedal). Further, the driver may cancel the request for assistance by inputting a cancel command to a display panel. If method 300 judges that operator assistance has been provided, the answer is yes and method 300 proceeds to 337. Otherwise, the answer is no and method 300 proceeds to 340.

At 337, method 300 determines timing to adjust driveline operating conditions so that the driveline operates in ranges where control parameters are immature. In one example, method 300 may select times when the vehicle is not proximate to other vehicles. Further, method 300 may select a time when the vehicle is traveling a section of road that is more than a predetermined distance at a constant grade as a time to adjust driveline operating conditions. Further still, method 300 may select a time when a coefficient of friction of the road the vehicle is traveling on is greater than a threshold coefficient of friction as a time to adjust driveline operating conditions. Method 300 proceeds to 338 after timing to adjust driveline operating conditions to operate within a range where driveline operating parameters are immature is determined.

At 338, method 300 acquires data, adapts driveline control parameters, and/or driveline control parameters in driveline operating regions determined to have immature control parameters and/or data in moderate collection mode. For example, method 300 may hold vehicle speed constant at a predetermined speed via adjusting engine torque and downshift a transmission to a lower gear to increase engine speed in the moderate collection mode. In this way, the driveline may be operated at a different engine speed to collect driveline data and allow driveline control parameters to be adapted/adjusted at different engine speeds. The engine speeds, motor speeds, engine torques, motor torques, and transmission gears the vehicle are operated at in the moderate collection mode in operating regions having immature control parameters where driveline operating condition adjustments from present operating conditions may be noticeable to a driver or passenger.

In another example, method 300 may operate the engine at a constant speed while sweeping spark timing (e.g., adjusting spark timing to more advanced and retarded spark timings from a base spark timing value) and opening the engine throttle in the moderate collection mode. In this way, MBT and borderline spark timings may be determined based on engine torque and indications of knock. Further, exhaust temperatures may be determined based on the different spark timings.

In still another example, cam timings may be swept (e.g., adjusting cam timing to more advanced and retarded cam timings from a base cam timing value) while throttle position is adjusted to maintain engine torque or to provide a desired engine torque in the moderate collection mode. Cylinder pressure sensors may provide data to determine indicated mean effective pressure (IMEP) to determine combustion stability and desirable cam timings. Intake manifold pressure may also be acquired for the purpose of determining cam timing values for reduced engine pumping losses.

Method 300 also adjusts and/or adapts control parameters at the operating conditions requested by the cloud network in the moderate collection mode. For example, method 300 may adapt controller gains, transfer functions, and values in tables and/or functions that describe engine, motor, transmission, and inverter operation via adjusting the engine, motor, and transmission to conditions prescribed by the cloud network. The driveline operating range may be significantly broader in the moderate collection mode than in the passive collection mode. For example, during the moderate collection mode, engine speed may be varied by 30% whereas in the passive collection mode engine speed may be varied by less than 5%. Other driveline operating conditions such as engine torque, motor speed, motor torque, transmission gear, and inverter current may be adjusted similarly between the passive and moderate collection modes. In this way, the driveline may be operated at conditions requested by the cloud network to acquire driveline data and adapt driveline control parameters.

Thus, at 337 and 338, method 300 adjusts the vehicle driving route and acquires data and/or control parameters only after driver approval is received. Method 300 proceeds to 398 after operating the driveline at conditions requested by the cloud network and acquiring data and/or control parameters.

At 340, method 300 collects data and adjusts or adapts driveline control parameters at operating conditions encountered when responding to driver demand torque without the driveline controller adjusting operating conditions in response to the request by the cloud network. Method 300 may adjust control parameters in the driveline operating ranges requested by the cloud network if the driver operates the driveline during those conditions. Method 300 proceeds to 398 of FIG. 3 after collecting data and/or control parameters at operating conditions encountered in response to driver demands.

Figure 6:
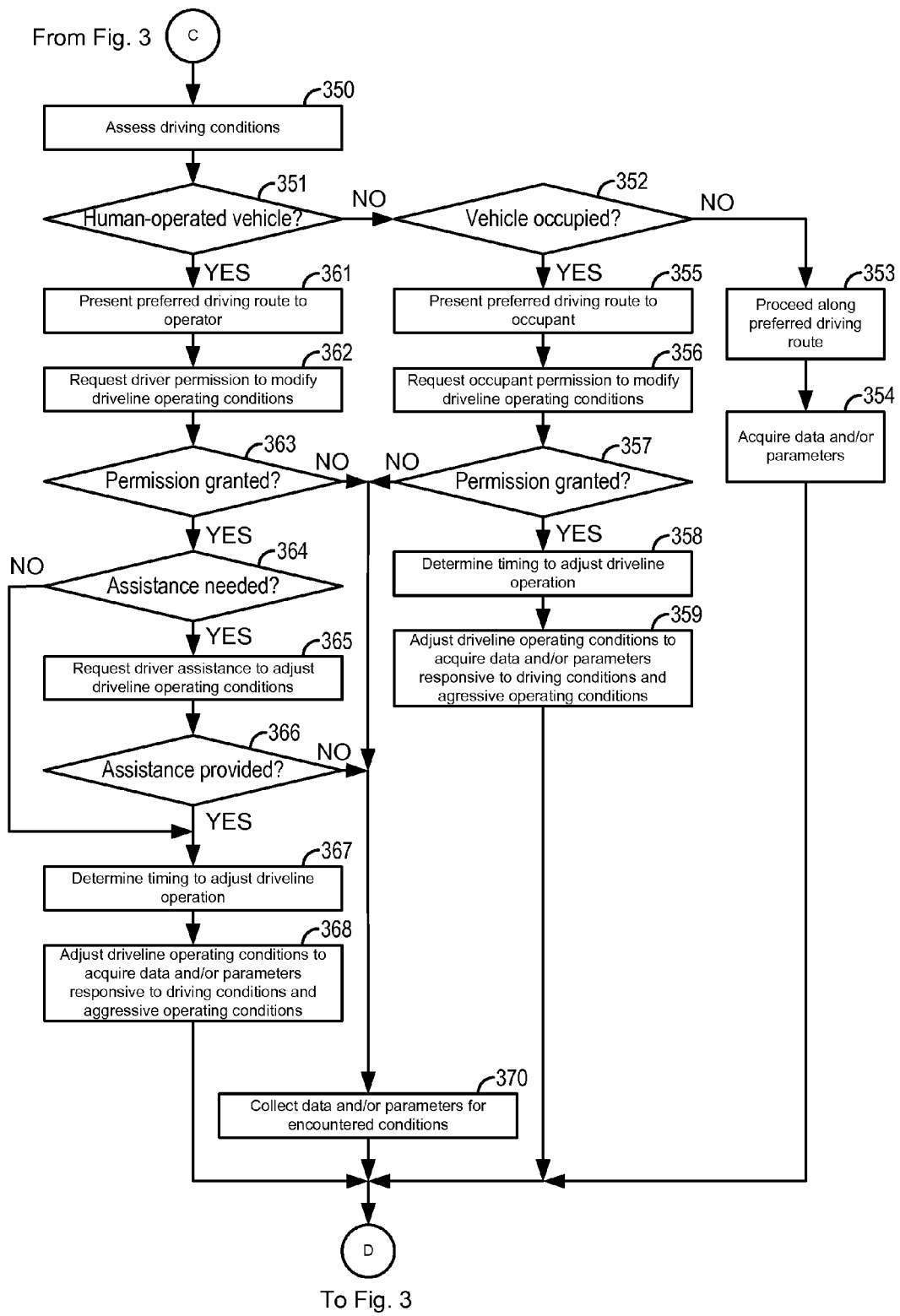

At 350 of FIG. 6, method 300 assesses driving conditions for operating the vehicle during aggressive collection mode. Method 300 may enter aggressive collection mode during select driveline operating conditions. For example, method 300 may judge aggressive driveline control parameter collection is desirable when the vehicle is occupied by a person identified via a key fob, cell phone proximity, or in another way. Method 300 may judge aggressive driveline control parameter collection is desirable based on traffic conditions such as operating the vehicle on a closed test track or where the vehicle speed limit is greater than a threshold speed. Additional traffic conditions that may initiate aggressive control parameter or data collection include but are not limited to operating the vehicle on a highway, roads with less than a threshold coefficient of friction, population density less than a threshold, and night light driving conditions. Aggressive collection may be initiated when the driveline operating region change for aggressive driveline parameter collection is greater than a third threshold change from the present driveline operating region. Additionally, aggressive collection may require driveline operating parameters be within a third range (e.g., transmission input shaft speed less than 7500 RPM and transmission input torque less than 500 N-m) greater than the second range, or that changes in driveline operating parameters be not limited based on vehicle operating conditions. Vehicle conditions may be determined via vehicle sensors, global positioning systems, or broadcast information.

Driving conditions may include but are not limited to posted vehicle speed, actual vehicle speed, proximity of vehicle to other vehicle (e.g., via sonic or radar), human population in area where vehicle is operating, engine speed, engine torque, motor speed, motor torque, selected transmission gear, engine temperature, ambient temperature and pressure, engine fuel flow, engine air flow, engine air-fuel ratio, day light or night conditions, road coefficient of friction, and identity of present driver. Method 300 proceeds to 351 after driving conditions are determined.

At 351, method 300 judges whether or not the vehicle is being operated by a driver or without a driver (e.g., autonomously). In one example, method determines if the vehicle is being operated by a driver based on a value of a variable stored in memory that indicates whether a driver or the vehicle controller is driving the vehicle. If method 300 judges that a human is driving the vehicle the answer is yes and method 300 proceeds to 361. Otherwise, the answer is no and method 300 proceeds to 352.

At 352, method 300 judges if the vehicle is occupied by a passenger while the vehicle is in moderate collection mode. In one example, method 300 judges if the vehicle is occupied based on seat sensors. Alternatively, method 300 may detect a passenger heart beat or a passenger via sonic sensors. If method 300 judges that the vehicle is occupied the answer is yes and method 300 proceeds to 355. Otherwise, the answer is no and method 300 proceeds to 353.

At 353, method 300 proceeds to direct the vehicle to follow a driving route offered by the cloud network as is described at 716 of FIG. 7. The driving route may offer the vehicle more time and opportunities to operate the vehicle at conditions requested by the cloud network (e.g., operating regions determined to have immature control parameters). Method 300 operates the vehicle (e.g., adjusts the engine throttle, valve timing, spark timing, transmission gear, motor current, and engine air-fuel ratio, etc.) to proceed along the driving route offered by the cloud network and proceeds to 354.

At 354, method 300 acquires data and/or driveline control parameters in driveline operating regions determined to have immature control parameters and/or data in an aggressive mode. For example, method 300 may hold vehicle speed constant at a predetermined speed via adjusting engine torque and downshift a transmission to a lower gear to increase engine speed in the moderate collection mode. In this way, the driveline may be operated at a different engine speed to collect driveline data and allow driveline control parameters to be adapted/adjusted at different engine speeds. The changes in engine speeds, motor speeds, engine torques, motor torques, and transmission gears the vehicle is operated at in the aggressive collection mode may be noticeable to a driver or passenger. In one example, the driveline may be operated to its full extent in aggressive mode. For example, the engine throttle may be opened fully opened and full engine and/or motor torque may be applied to the transmission.

In another example, method 300 may operate the engine at a constant speed while sweeping spark timing (e.g., adjusting spark timing to more advanced and retarded spark timings from a base spark timing value) and opening the engine throttle in the aggressive collection mode. In this way, MBT and borderline spark timings may be determined based on engine torque and indications of knock at high engine speeds and loads. Further, exhaust temperatures may be determined based on the different spark timings.

In still another example, cam timings may be swept (e.g., adjusting cam timing to more advanced and retarded cam timings from a base cam timing value) while throttle position is adjusted to maintain engine torque or to provide a desired engine torque in the aggressive collection mode. Cylinder pressure sensors may provide data to determine indicated mean effective pressure (IMEP) to determine combustion stability and desirable cam timings. Intake manifold pressure may also be acquired for the purpose of determining cam timing values for reduced engine pumping losses.

Method 300 also adjusts and/or adapts control parameters at the operating conditions requested by the cloud network in the aggressive collection mode. For example, method 300 may adapt controller gains, transfer functions, and values in tables and/or functions that describe engine, motor, transmission, and inverter operation via adjusting the engine, motor, and transmission to conditions prescribed by the cloud network. The driveline operating range may be significantly broader in the aggressive collection mode than in the passive or moderate collection modes. For example, during the aggressive collection mode, engine speed may be varied to the full extent of the engine's operating range whereas in the moderate collection mode engine speed may be varied by less than 30% and engine speed may be maintained at less than a threshold speed, the threshold speed less than the engine's maximum speed. Other driveline operating conditions such as engine torque, motor speed, motor torque, transmission gear, and inverter current may be adjusted similarly between the aggressive and moderate collection modes. In this way, the driveline may be operated at conditions requested by the cloud network to acquire driveline data and adapt driveline control parameters.

Thus, at 353 and 354, method 300 adjusts the vehicle driving route and acquires data and/or control parameters without drive approval. Method 300 proceeds to 398 after operating the driveline at conditions requested by the cloud network and acquiring data and/or control parameters.

At 355, method 300 presents a preferred driving route to vehicle occupants. The preferred driving route may be a route that is expected to present more opportunities or time for the driveline to operate at conditions where control parameters in the select operating regions are immature. The preferred driving route may be presented to vehicle occupants via a navigation system. Method 300 proceeds to 356 after the preferred driving route is presented to vehicle occupants.

At 356, method 300 requests occupant permission to modify driveline operating conditions so that the driveline operates in operating regions where driveline control parameters are immature. Driveline operating conditions may include but are not limited to engine speed, engine torque, motor speed, motor torque, transmission gear, torque converter clutch state (e.g., open, closed, or slip amount), engine throttle opening amount, engine cam positions, engine spark timing, motor current use, motor current when motor operated as a generator, and turbocharger boost amount. Method 300 may request permission via a driver interface display or panel. Method 300 proceeds to 357 after requesting permission to modify driveline operating conditions.

At 357, method 300 judges whether or not vehicle occupants have granted permission to adjust driveline operating conditions. The driver may grant permission via a driver interface or display panel. If an occupant has granted permission the answer is yes and method 300 proceeds to 358. Otherwise, the answer is no and method 300 proceeds to 370. Method 300 also proceeds to operate the vehicle along the preferred driving route if permission is granted.

At 358, method 300 determines timing to adjust driveline operating conditions so that the driveline operates in ranges where control parameters are immature. In one example, method 300 may select times when the vehicle is not proximate to other vehicles. Further, method 300 may select a time when the vehicle is traveling a section of road that is more than a predetermined distance at a constant grade as a time to adjust driveline operating conditions. Further still, method 300 may select a time when a coefficient of friction of the road the vehicle is traveling on is greater than a threshold coefficient of friction as a time to adjust driveline operating conditions. Method 300 proceeds to 359 after timing to adjust driveline operating conditions to operate within a range where driveline operating parameters are immature is determined.

At 359, method 300 acquires data, adapts driveline control parameters, and/or driveline control parameters in driveline operating regions determined to have immature control parameters and/or data in aggressive collection mode. For example, method 300 may hold vehicle speed constant at a predetermined speed via adjusting engine torque and downshift a transmission to a lower gear to increase engine speed in the aggressive collection mode. In this way, the driveline may be operated at a different engine speed to collect driveline data and allow driveline control parameters to be adapted/adjusted at different engine speeds. The engine speeds, motor speeds, engine torques, motor torques, and transmission gears the vehicle are operated at in the aggressive collection mode in operating regions having immature control parameters where driveline operating condition adjustments from present operating conditions may be noticeable to a driver or passenger.

In another example, method 300 may operate the engine at a constant speed while sweeping spark timing (e.g., adjusting spark timing to more advanced and retarded spark timings from a base spark timing value) and opening the engine throttle in the moderate collection mode. In this way, MBT and borderline spark timings may be determined based on engine torque and indications of knock at higher engine speed and load conditions than in the moderate collection mode. Further, exhaust temperatures may be determined based on the different spark timings.

In still another examples, cam timings may be swept (e.g., adjusting cam timing to more advanced and retarded cam timings from a base cam timing value) while throttle position is adjusted to maintain engine torque or to provide a desired engine torque in the aggressive collection mode. Cylinder pressure sensors may provide data to determine indicated mean effective pressure (IMEP) to determine combustion stability and desirable cam timings. Intake manifold pressure may also be acquired for the purpose of determining cam timing values for reduced engine pumping losses.

Method 300 also adjusts and/or adapts control parameters at the operating conditions requested by the cloud network in the aggressive collection mode. For example, method 300 may adapt controller gains, transfer functions, and values in tables and/or functions that describe engine, motor, transmission, and inverter operation via adjusting the engine, motor, and transmission to conditions prescribed by the cloud network. The driveline operating range may be significantly broader in the aggressive collection mode than in the passive and moderate collection modes. For example, during the aggressive collection mode, engine speed increase to maximum engine speed whereas in the moderate and passive collection modes engine speed may be restricted to less than maximum engine speed. Other driveline operating conditions such as engine torque, motor speed, motor torque, transmission gear, and inverter current may be adjusted similarly between the passive and moderate collection modes. In this way, the driveline may be operated at conditions requested by the cloud network to acquire driveline data and adapt driveline control parameters.

Thus, at 358 and 359, method 300 adjusts the vehicle driving route and acquires data and/or control parameters only after driver approval is received. Method 300 proceeds to 398 after operating the driveline at conditions requested by the cloud network and acquiring data and/or control parameters.

At 361, method 300 presents a preferred driving route to the vehicle's driver. The preferred driving route may be a route that is expected to present more opportunities or time for the driveline to operate at conditions where control parameters in the select operating regions are immature. The preferred driving route may be presented to vehicle occupants via a navigation system. Method 300 proceeds to 362 after the preferred driving route is presented to the vehicle driver.

At 362, method 300 requests driver permission to modify driveline operating conditions so that the driveline operates in operating regions where control parameters are immature. Driveline operating conditions may include but are not limited to engine speed, engine torque, motor speed, motor torque, transmission gear, torque converter clutch state (e.g., open, closed, or slip amount), engine throttle opening amount, engine cam positions, engine spark timing, motor current use, motor current when motor operated as a generator, and turbocharger boost amount. Method 300 may request permission via a driver interface display or panel. Method 300 proceeds to 363 after requesting permission to modify driveline operating conditions.

At 363, method 300 judges whether or not a driver or operator has granted permission to adjust driveline operating conditions. The driver may grant permission via a driver interface or display panel. If a drive has permitted permission the answer is yes and method 300 proceeds to 364. Otherwise, the answer is no and method 300 proceeds to 370. Method 300 also proceeds along the preferred driving route if permission is granted.

At 364, method 300 judges whether or not driver assistance is needed or desired to operate the vehicle in ranges where driveline control parameters are immature. For example, driver assistance to apply an accelerator pedal may be desired when a vehicle is accelerated from stop. If method 300 judges that driver assistance is needed, the answer is yes and method 300 proceeds to 365. Otherwise, the answer is no and method 300 proceeds to 367.

At 365, method 300 requests driver assistance. Driver assistance may be requested via a display panel or other means. Method 300 proceeds to 366 after driver assistance is requested.

At 366, method 300 judges if driver assistance has been provided. Driver assistance may be determined to be provided is a driver provides input to the vehicle controller (e.g., a driver applies an accelerator or brake pedal). Further, the driver may cancel the request for assistance by inputting a cancel command to a display panel. If method 300 judges that operator assistance has been provided, the answer is yes and method 300 proceeds to 367. Otherwise, the answer is no and method 300 proceeds to 370.

At 367, method 300 determines timing to adjust driveline operating conditions so that the driveline operates in ranges where control parameters are immature. In one example, method 300 may select times when the vehicle is not proximate to other vehicles. Further, method 300 may select a time when the vehicle is traveling a section of road that is more than a predetermined distance at a constant grade as a time to adjust driveline operating conditions. Further still, method 300 may select a time when a coefficient of friction of the road the vehicle is traveling on is greater than a threshold coefficient of friction as a time to adjust driveline operating conditions. Method 300 proceeds to 368 after timing to adjust driveline operating conditions to operate within a range where driveline operating parameters are immature is determined.

At 368, method 300 acquires data, adapts driveline control parameters, and/or acquires driveline control parameters in driveline operating regions determined to have immature control parameters and/or data in moderate collection mode. For example, method 300 may hold vehicle speed constant at a predetermined speed via adjusting engine torque and downshift a transmission to a lower gear to increase engine speed in the moderate collection mode. In this way, the driveline may be operated at a different engine speed to collect driveline data and allow driveline control parameters to be adapted/adjusted at different engine speeds. The engine speeds, motor speeds, engine torques, motor torques, and transmission gears the vehicle is operated at in the aggressive collection mode may be noticeable to a driver or passenger.

In another example, method 300 may operate the engine at a constant speed while sweeping spark timing (e.g., adjusting spark timing to more advanced and retarded spark timings from a base spark timing value) and opening the engine throttle in the aggressive collection mode. In this way, MBT and borderline spark timings may be determined based on engine torque and indications of knock. Further, exhaust temperatures may be determined based on the different spark timings.

In still another example, cam timings may be swept (e.g., adjusting cam timing to more advanced and retarded cam timings from a base cam timing value) while throttle position is adjusted to maintain engine torque or to provide a desired engine torque in the aggressive collection mode. Cylinder pressure sensors may provide data to determine indicated mean effective pressure (IMEP) to determine combustion stability and desirable cam timings. Intake manifold pressure may also be acquired for the purpose of determining cam timing values for reduced engine pumping losses.

Method 300 also adjusts and/or adapts control parameters at the operating conditions requested by the cloud network in the aggressive collection mode. For example, method 300 may adapt controller gains, transfer functions, and values in tables and/or functions that describe engine, motor, transmission, and inverter operation via adjusting the engine, motor, and transmission to conditions prescribed by the cloud network. The driveline operating range may be significantly broader in the aggressive collection mode than in the moderate collection mode. For example, during the aggressive collection mode, engine speed may achieve maximum engine speed whereas in the moderate collection mode engine speed may be restricted to less than a predetermined speed (e.g., 3000 RPM). Other driveline operating conditions such as engine torque, motor speed, motor torque, transmission gear, and inverter current may be adjusted similarly between the moderate and aggressive collection modes. In this way, the driveline may be operated at conditions requested by the cloud network to acquire driveline data and adapt driveline control parameters.

Thus, at 367 and 368, method 300 adjusts the vehicle driving route and acquires data and/or control parameters only after driver approval is received. Method 300 proceeds to 398 after operating the driveline at conditions requested by the cloud network and acquiring data and/or control parameters.

At 370, method 300 collects data and adjusts or adapts driveline control parameters at operating conditions encountered when responding to driver demand torque without the driveline controller adjusting operating conditions in response to the request by the off board cloud network. Method 300 may adjust control parameters in the driveline operating ranges requested by the cloud network if the driver operates the driveline during those conditions. Method 300 proceeds to 398 of FIG. 3 after collecting data and/or control parameters at operating conditions encountered in response to driver demands.

Figure 3:
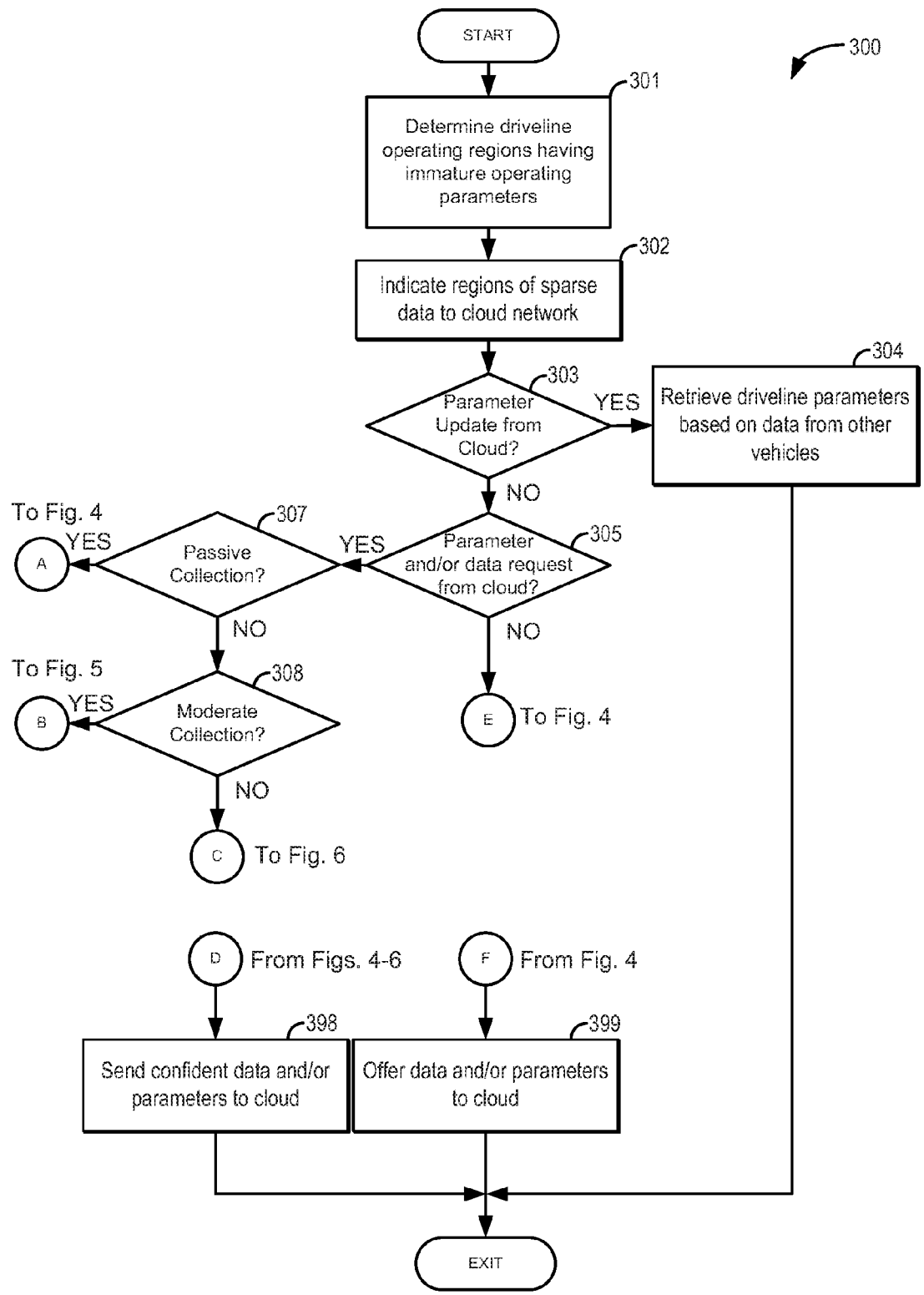
FIGS. 3-6 show an example method for operating a vehicle driveline.

Thus, the method of FIG. 3 may adjust engine operating conditions according to a request from a cloud network to determine driveline control parameters in driveline operating ranges where driveline control parameters are immature. Additionally, method 300 may adjust and determine driveline control parameters in driveline operating regions (e.g., speed and torques) where a driver or operator requests operation. The driveline operating parameters may be delivered to the cloud network and supplied to other vehicles to reduce hours developing driveline control parameters.

It should also be noted that method 300 may interrupt passive, moderate, and aggressive collection modes any time if vehicle indications indicate conditions that may be undesirable for the collection modes. For example, if an object is obstructing a road or if engine temperature is greater than desired, method 300 may defer to driver operation or move the vehicle to the road shoulder and idle the engine.

Referring now to FIG. 7, an example method for a cloud network to map driveline control parameters is shown. The cloud network may optimize and operate a vehicle driveline at varying operating conditions to determine driveline control parameters (e.g., mapping) such as minimum spark for best torque (MBT), manifold filling time constants, sensor and actuator transfer functions, and other driveline control parameters. Further, the cloud network may select specific vehicles as a basis for determining the driveline control parameters. The cloud network may also determine regions in an operating range of the driveline where driveline control parameters are immature so that driveline control parameters may be adapted and revised. The method of FIG. 7 may be incorporated into the system of FIGS. 1 and 2 as executable instructions.

At 702, method 700 selectively updates or revises driveline control parameters and/or driveline data for a group of vehicles that operate based on the driveline control parameters. The driveline control parameters may be offered by one or more vehicles that operate with the driveline control parameters. One or more vehicles may broadcast a request to upload data and/or control parameters to the cloud network via a radio frequency communication system. The cloud network may accept or reject the request. If the cloud network accepts the request, the cloud network revises control parameters stored in a database of control parameters that are used in a plurality of vehicle that include a driveline similar to the driveline of the vehicle requesting to upload the control parameters. Method 700 proceeds to 704 after receiving requests to upload vehicle data and/or control parameters.

At 704, method 700 judges if an intrusion of vehicle operating conditions to acquire data and/or control parameters is scheduled. An intrusion may be made at predetermined intervals (e.g., weekly or monthly). Alternatively, a cloud administrator may request an intrusion of vehicle driving conditions via the cloud network. If method 700 judges that an intrusion is scheduled, method 700 proceeds to 712. Otherwise, method 700 proceeds to 706.

At 706, method 300 determines driveline operation regions stored in the cloud network database that include immature driveline control parameter values. Driveline operating regions may include but are not limited to engine speed ranges (e.g., 1000 RPM-2000 RPM), engine torque ranges (e.g., 5 Nm-400 Nm), motor torque ranges (e.g., 0 Nm-200 Nm), motor speed ranges (e.g., 0 RPM-1000 RPM), transmission input speed ranges (e.g., 0 RPM-6000 RPM), transmission input torque ranges (e.g., 0 Nm-500 Nm), motor input current (e.g., 1-200 Amperes), motor output current (e.g., 1-100 Amperes), inverter input current (e.g., 1-200 Amperes), inverter output current (e.g., 1-300 Amperes).

Immature driveline control parameter values are variable values stored in the cloud network database that are the basis of control commands, controller operating states, and control variables that have not been adjusted responsive to operating conditions of vehicles in a group of a plurality of vehicles that may operate with control parameters from the cloud network database. Immature driveline control parameters may be referred to as default driveline control parameters since they are parameters that have not been adjusted based on vehicles in a group of a plurality of vehicles that may operate with control parameters from the network database. The default driveline control parameters may be stored in individual variables, tables and/or functions within the database.

In one example, the default driveline control parameters may contain predetermined values. If the predetermined values have changed from the default values, it may be determined that the specific driveline control parameters are not default or immature driveline control parameters. In other examples, an area of cloud network memory may be set aside to include bits in memory that indicate whether or not specific individual driveline control parameters have been adapted or adjusted based on operating conditions of vehicles in a group of a plurality of vehicles that may operate with control parameters from the network database. If a specific driveline control parameter has been adjusted, the bit may be changed from a value of zero to a value of one. Method 300 judges if specific driveline control parameters are immature or mature (e.g., adjusted based on vehicle conditions of the vehicles in a group of a plurality of vehicles that may operate with control parameters from the network database) based on values of variables in memory. Default or immature driveline control parameters are identified and their specific locations in tables and/or function are identified. For example, data cells at column 3, row 2, to column 5, row 2 of a table describing minimum spark timing for best torque may be indicated as immature variables. Row 2 of the table may correspond to 700 RPM and column 3-5 may correspond to engine torque of 40-60 Nm. Method 700 proceeds to 708 after determining which, if any, driveline operating regions and driveline control variables in the cloud network database are immature.

At 708, method 700 judges if data in the cloud network database is sparse. Method 700 may judge data in the cloud network database is sparse if the cloud network database includes immature values of driveline control parameters. If method 700 judges that data in the cloud network database is sparse, the answer is yes and method 700 proceeds to 712. Otherwise, the answer is no and method 700 proceeds to 710.

At 710, method 700 does not intrusively collect data and/or driveline control parameters from vehicle. Thus, if values in the cloud network database are mature, the cloud network does not require further database updates and method 700 exits.

At 712, method 700 determines driveline operating regions for data collection and/or driveline control parameter acquisition. Driveline data may be requested to be collected by the cloud network to optimize control parameters. The data acquired may describe engine operation such as but not limited to spark timing, motor torque production, engine torque production, engine cooling temperature, ambient air temperature and pressure, vehicle speed, engine and transmission oil pressures, engine exhaust temperature, engine valve timing, engine speed, engine air-fuel ratio, engine airflow, engine fuel flow, and motor current. Driveline control parameters may include but are not limited to MBT spark timing, borderline spark timing, engine intake manifold filling time constants, sensor and actuator transfer functions, engine controller gains (e.g., exhaust gas recirculation valve controller gains), motor controller gains, transmission clutch transfer functions, and other driveline control parameters.

In one example, method 700 determines the driveline operating region for data collection and/or driveline control parameter acquisition as driveline speeds and torques where data and/or control parameters in the cloud network database are immature. For example, if engine control parameters for an engine speed of 2000 RPM and torque of 50 N-m have not been adapted or adjusted based on conditions of an operating vehicle, method 700 selects an engine speed of 2000 RPM and torque of 50 N-m as a driveline operating region for data collection and/or driveline control parameter acquisition. Method 700 proceeds to 714 after the driveline operating regions have been determined.

At 714, method 700 identifies candidate vehicles for intrusive data collection (e.g., data collection and/or parameter collection based on driveline operating conditions as requested by the cloud network). In one example, method 700 selects vehicles based on driveline configuration. In particular, vehicles having a driveline that corresponds to the database stored in the cloud network (e.g., a conventional engine and transmission driveline or a hybrid driveline including an engine, transmission, and motor) may be selected. Further, a vehicle traveling a prescribed path may be selected (e.g., a vehicle on a closed test track or driving on a rural road) based on the driveline operating region for data and/or driveline parameter collection. Additionally, the selected vehicle or vehicles may be based on ambient operating conditions where the vehicle is operating (e.g., coefficient of road friction, ambient temperature, ambient pressure, ambient humidity). Further still, a vehicle may be selected based on a driver profile (e.g., attributes that characterize a driver as aggressive and not aggressive). Method 700 proceeds to 716 after one or more vehicles are selected for data and/or driveline control parameter collection.

At 716, method requests data and/or driveline control parameter collection at the region determined at 712 from the vehicles determined at 714. In one example, method 700 requests data and/or driveline control parameters via broadcasting a request over a radio frequency communications system. Method 700 may also offer driving routes for the one or more vehicles to follow to acquire the data and/or driveline control parameter. The driving routes may be based off global positioning satellite information and maps that identify road grade and road altitude. Method 700 proceeds 718 after requesting data and/or driveline control parameter acquisition.

At 718, method 700 retrieves data and/or driveline control parameters from the vehicles selected at 714. The data and/or driveline control parameters may be retrieved via the radio frequency communication system. Method 700 proceeds to 720 after the data and/or driveline control parameters are retrieved.

At 720, method 700 adjusts values in the cloud network database that are the basis for driveline operation. Method 700 may first check that data and/or control parameters uploaded from vehicles at 718 in the region determined at 712 are within prescribed limits. If data are within prescribed limits, the cloud network database is updated or revised base on values collected from the vehicles at 718. Method 700 proceeds to 722 after values in the database are revised.

At 722, method 700 downloads data and/or control parameters from the cloud network system database to other vehicles. The data and/or control parameters may be downloaded to other vehicles (e.g., vehicles other than the vehicle collecting the data) via the radio frequency communication system. The other vehicles are then operated based on the downloaded data and/or control parameters. Method 700 proceeds to exit after data and/or control parameters have been downloaded to other vehicles.

In this way, a cloud network may direct a vehicle to operate at conditions where driveline control parameters are immature so that the vehicle may adapt and upload the driveline control parameters to the cloud network. Further, the cloud network may optimize driveline control parameters and download the driveline control parameters to other vehicles. Further, the vehicles may be operated autonomously to reduce human hours used to determine the driveline control parameters. The methods described herein apply to a vehicle operated on a road or test track.

Thus, the methods of FIGS. 3-7 provide for a method for operating a driveline, comprising: receiving driveline parameter mapping conditions to a controller in a vehicle from a remote off vehicle network; and adjusting, driveline operation conditions to the driveline parameter mapping conditions via the controller. The method further comprises determining one or more control parameters at the driveline parameter mapping conditions and storing the one or more control parameters to memory. The method further comprises uploading the one or more control parameters to the remote off vehicle network. The method further comprises downloading the one or more control parameters to other vehicles.

In some examples, the method further comprises operating the other vehicles based on the one or more control parameters. The method includes where the driveline operating conditions include a motor speed and torque. The method includes where the driveline operating conditions include an engine speed and torque. The method includes where the driveline operating conditions include a specified transmission gear.

The methods of FIGS. 3-7 also provide for a method for operating a driveline, comprising: receiving driveline parameter mapping conditions to a controller in a vehicle from a remote off vehicle network; adjusting, driveline operation conditions to the driveline parameter mapping conditions via the controller; and entering one of three data gathering modes including passive, moderate, and aggressive modes. The method includes where there are only three data gathering modes, and where the passive mode includes adjusting driveline operating conditions without driver permission. The method includes where adjustments to the driveline operating conditions are smaller in magnitude for the passive mode than for the moderate mode. The method includes where adjustments to the driveline operating conditions are smaller in magnitude for the moderate mode than the passive mode.

In some examples, the method includes where a driver is notified of a request to adjust the driveline operating conditions. The method also includes where the driver is requested to change a vehicle input. The method also includes where the vehicle is driven autonomously without a driver.

The methods of FIGS. 3-7 also provide for a method for operating a driveline, comprising: broadcasting driveline parameter mapping conditions to a controller in a vehicle from a remote off vehicle network in response to one or more default driveline control parameters; adjusting driveline operation conditions to driveline parameter mapping conditions, the driveline parameter mapping conditions being a basis for adjusting the default driveline control parameters; and entering a data gathering mode. The method includes where an engine of the driveline is operated at a constant speed at the driveline operating conditions.

In some examples, the method includes where driveline operating conditions include throttle position and transmission gear. The method further comprises evaluating driving conditions, and not adjusting driveline operating conditions when driving conditions do not conform to predetermined driving conditions. The method further comprises not adjusting driveline operating conditions in response to driver input to the controller.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method for operating a driveline, comprising:
transmitting to a controller of a vehicle, driveline operating regions where immature driveline parameters exist in a database of a remote off vehicle network;
adjusting an actuator responsive to a request from the remote off vehicle network via the controller, the actuator adjusted to operate the driveline at the operating regions where the immature driveline parameters exist;
providing three data gathering modes for adjusting the immature driveline parameters in the database of the remote off vehicle network;

a first of the three data gathering modes requiring driveline operating parameters change less than a first threshold;

a second of the three data gathering modes requiring driveline operating parameters change less than a second threshold, the second threshold greater than the first threshold; and a third of the three data gathering modes requiring driveline operating parameters change greater than the second threshold.

2. The method of claim 1, further comprising:

determining one or more control parameters at the driveline operating regions where the immature driveline parameters exist; and updating parameters of the database based on the one or more control parameters, where the immature driveline parameters are default driveline control parameters that have not been adjusted based on vehicle operation.

3. The method of claim 2, where updating parameters of the database includes uploading the one or more control parameters to the remote off vehicle network.

4. The method of claim 3, further comprising downloading the updated parameters to other vehicles.

5. The method of claim 4, further comprising operating the other vehicles based on the updated parameters.

6. The method of claim 1, where the driveline operating regions are based on engine speed and torque; and further comprising: requesting driver permission to operate the driveline in the first of the three data gathering modes when changes in the first of the three data gathering modes would be noticeable, the changes in the first of the three data gathering modes would be noticeable when a control parameter change is greater than a threshold difference between a changed parameter and a present condition; and not requesting driver permission to operate the driveline in the first of the three data gathering modes when changes in the first of the three data gathering modes would be not be noticeable, the changes in the first of the three data gathering modes would not be noticeable when the control parameter change is less than a threshold difference between a changed parameter and a present condition.

7. The method of claim 6, where the driveline operating regions include a specified transmission gear; and further comprising: judging whether or not the vehicle, which includes the driveline, is occupied before the vehicle proceeds on a preferred driving route in the second and third data gathering modes of the three data gathering modes, the preferred driving route determined by the remote off vehicle network.

8. A method for operating a driveline, comprising:

transmitting to a controller of a vehicle, driveline operating regions where immature driveline parameters exist in a database of a remote off vehicle network;

adjusting an actuator responsive to a request from the remote off vehicle network via the controller, the actuator adjusted to operate the driveline at the driveline operating regions where the immature driveline parameters exist; and entering one of three data gathering modes including passive, moderate, and aggressive modes where the immature driveline parameters are updated via the controller.

9. The method of claim 8, where there are only three data gathering modes;

where the passive mode includes adjusting driveline operating conditions without driver permission; and further comprising: judging whether or not the vehicle, which includes the driveline, is human operated before the vehicle proceeds on a preferred driving route determined by the remote off vehicle network in second and third data gathering modes of the three data gathering modes.

10. The method of claim 9, where adjustments to the driveline operating conditions are smaller in magnitude for the passive mode than for the moderate mode.

11. The method of claim 8, where a first of the three data gathering modes requires driveline operating parameters change less than a first threshold;

where a second of the three data gathering modes requires driveline operating parameters change less than a second threshold, the second threshold greater than the first threshold; and where a third of the three data gathering modes requires driveline operating parameters change greater than the second threshold.

12. The method of claim 8, where a driver is notified of a request to adjust driveline operating conditions.

13. The method of claim 12, where the driver is requested to change a vehicle input.

14. The method of claim 8, where the vehicle is driven autonomously.

15. A method for operating a driveline, comprising:

broadcasting driveline operating regions where immature driveline parameters exist in a database of a remote off vehicle network to a controller in a vehicle in response to one or more of the immature driveline parameters being in the database;

adjusting an actuator responsive to a request from the remote off vehicle network via the controller;

the actuator adjusted to operate the driveline at the operating regions where the immature driveline parameters exist;

the driveline operating regions being a basis for adjusting the immature driveline parameters;

entering a data gathering mode where the immature driveline parameters are updated via the controller; and not adjusting driveline operating conditions in response to vehicle occupant input to the controller when the vehicle is not human operated.

16. The method of claim 15, where an engine of the driveline is operated at a constant speed at driveline operating conditions; and further comprising: judging if the vehicle is occupied when the vehicle is not human operated before acquiring data and adjusting driveline operating conditions.

17. The method of claim 15, where driveline operating conditions include throttle position and transmission gear;

where the data gathering mode is one of three data gathering modes; and further comprising: a first of the three data gathering modes requiring driveline operating parameters change less than a first threshold;

a second of the three data gathering modes requiring driveline operating parameters change less than a second threshold, the second threshold greater than the first threshold; and a third of the three data gathering modes requiring driveline operating parameters change greater than the second threshold.

18. The method of claim 15, further comprising evaluating road conditions, and not adjusting immature driveline parameters when road conditions do not conform to predetermined driving conditions.

* * * * *